(12) United States Patent
Morse et al.

(10) Patent No.: US 10,669,030 B1
(45) Date of Patent: Jun. 2, 2020

(54) SEAT PAN DIAPHRAGM

(71) Applicant: B/E Aerospace, Inc., Winston-Salem, NC (US)

(72) Inventors: Eric H. Morse, Tobaccoville, NC (US); Matt J. Hulse, Mooresville, NC (US); Samuel Ponjican, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/391,781

(22) Filed: Apr. 23, 2019

(51) Int. Cl.
*B64D 11/06* (2006.01)
*A47C 7/22* (2006.01)

(52) U.S. Cl.
CPC ............ *B64D 11/0647* (2014.12); *A47C 7/22* (2013.01)

(58) Field of Classification Search
CPC ....... B64D 11/0647; A47C 7/22; A47C 7/282; A47C 7/285
See application file for complete search history.

(56) References Cited

U.S. PATENT DOCUMENTS

| | | | | |
|---|---|---|---|---|
| 3,527,499 | A * | 9/1970 | Rathbun | A47C 7/22 297/452.52 |
| 3,616,142 | A * | 10/1971 | Schrotenboer | A47C 7/22 442/35 |
| 5,735,578 | A | 4/1998 | Penley | |
| 6,604,792 | B1 | 8/2003 | Picard | |
| 6,695,406 | B2 | 2/2004 | Plant | |
| 6,722,742 | B2 | 4/2004 | Potes et al. | |
| 6,802,568 | B1 | 10/2004 | Johnson | |
| 8,047,613 | B1 | 11/2011 | Ahad | |
| 9,560,916 | B1 * | 2/2017 | Bullard | A47C 7/22 |
| 2015/0137576 | A1 * | 5/2015 | Bullard | A47C 3/00 297/452.18 |
| 2015/0226245 | A1 * | 8/2015 | Frankel | A45F 3/22 24/482 |
| 2017/0354259 | A1 * | 12/2017 | Gale | A47C 7/22 |

FOREIGN PATENT DOCUMENTS

| | | | | |
|---|---|---|---|---|
| CA | 2827991 | A1 * | 10/2012 | ............... B60N 2/68 |
| CH | 185891 | A * | 8/1936 | |
| DE | 2606115 | A1 * | 9/1976 | ............... A47C 7/22 |
| DE | 2641435 | B1 * | 2/1978 | ......... B64D 11/0647 |
| EP | 3473544 | A2 * | 4/2019 | ............ B64D 11/06 |
| FR | 810723 | A * | 3/1937 | |
| FR | 1496308 | A * | 9/1967 | |
| GB | 904978 | A * | 9/1962 | ............. A47C 7/282 |
| WO | WO-2011082127 | A1 * | 7/2011 | ............... A47C 7/22 |
| WO | WO-2017192875 | A1 * | 11/2017 | ......... B64D 11/0642 |

* cited by examiner

*Primary Examiner* — Timothy J Brindley
(74) *Attorney, Agent, or Firm* — Clements Bernard Walker

(57) ABSTRACT

A seat pan diaphragm assembly and a seat assembly including the same, the seat pan diaphragm assembly including a diaphragm subassembly including a flexible fabric panel having a top, bottom, front, back, and opposing lateral sides, a cargo net subassembly for limiting deflection of the flexible fabric panel under load, the cargo net subassembly including a grid of belts and attachment straps having a clip attachable to a seat frame element, and stiffeners received in slotted sleeves of the diaphragm subassembly and engaging the cargo net subassembly for securing the cargo net subassembly to the diaphragm subassembly.

20 Claims, 9 Drawing Sheets

SEAT PAN DIAPHRAGM

BACKGROUND

Aircraft passenger seat constructions typically include backrests and seat pans supported between vertically standing frame elements such as spreaders. Spreaders are typically stationary, while backrests typically recline. Some seats may have seat pans that actively adjust with a reclining backrest, while other seats may have stationary seat pans.

As durability against undue wear is preferred in seat components, even a stationary seat pan supporting a seat cushion should permit reclining backrest adjustments without displacing or excessively wearing the seat cushion. The condition and placement of a seat cushion are at least somewhat determinative of passenger comfort. Thus, pressure points are preferably minimized and the distribution of load forces is preferred.

Aircraft passenger seats are typically arranged in rows, with adjacent seats sharing a spreader between their nearest lateral sides. Thus, devices by which the elements of one passenger seat are attached to a spreader should permit the elements of an adjacent seat to attach to the same spreader.

Accordingly, what is needed is an improved seat pan construction that permits a spreader to be shared by adjacent seats, prevents pressure points, and permits reclining backrest adjustments while preventing displacement and excessive wear of a seat cushion.

SUMMARY OF THE INVENTIVE ASPECTS

To achieve the foregoing and other advantages, the inventive aspects disclosed herein are directed to a seat pan diaphragm assembly attachable to a seat frame including a diaphragm subassembly including a flexible fabric panel having a top, a bottom, a front, a back, opposing lateral sides, and a slotted sleeve positioned along each of the opposing lateral sides, a cargo net subassembly positioned against the bottom of the fabric panel for limiting deflection of the flexible fabric panel under load, the cargo net subassembly including a grid of belts and a plurality of lateral attachment straps extending outward beyond the opposing lateral sides of the flexible fabric panel, each of the lateral attachment straps terminating at a free end in a clip attachable to a seat frame element, and stiffeners positioned in the slotted sleeves received through loops of the attachments straps to secure the cargo net subassembly to the diaphragm subassembly.

In some embodiments, the slotted sleeves may be positioned from the front to the back of the flexible fabric panel, and wherein each lateral attachment strap is positioned in a slot between spaced portions of the slotted sleeve.

In some embodiments, each attachment strap may include a loop positioned inward of the free end in-line with the respective slotted sleeve.

In some embodiments, the cargo net subassembly may include first parallel spaced belts extending from front to back of the flexible fabric panel and second parallel spaced belts extending laterally, wherein the lateral attachment straps are secured to ends of the second parallel spaced belts or are integrally-formed with the second parallel spaced belts.

In some embodiments, the diaphragm subassembly may further include a front flap attached to or integrally-formed with the front of the flexible fabric panel that extends forward of the front of the flexible fabric panel.

In some embodiments, the diaphragm subassembly may further include a lumbar tail having a forward end attached to or integrally-formed with the back of the flexible fabric panel and an upper end attachable to a lower end of a backrest.

In some embodiments, each attachment clip may include a pair of spaced hooks, and wherein at least some of the attachment clips are configured to be overlapped by attachment clips of a laterally-adjacent seat pan diaphragm assembly.

In some embodiments, the diaphragm subassembly may further include a longitudinally-extending flap positioned at each corner of the flexible fabric panel in-line with the respective slotted sleeve, each of the longitudinally-extending flaps configured to be folded over and secured to the bottom of the flexible fabric panel to retain the stiffeners in the slotted sleeves.

In some embodiments, the diaphragm subassembly may further include at least one fastener element positioned on the top of the flexible fabric panel for securing in place at least one of a seat cushion and a dress cover.

The inventive aspects disclosed herein are further directed to an aircraft passenger seat assembly including spaced first and second frame members and a seat pan diaphragm assembly positioned between and removably attached to the spaced first and second frame members. The seat pan diaphragm assembly includes a diaphragm subassembly including a flexible fabric panel having a top, a bottom, a front, a back, opposing lateral sides, and a slotted sleeve positioned along each of the opposing lateral sides, a cargo net subassembly positioned against the bottom of the fabric panel for limiting deflection of the flexible fabric panel under load, the cargo net subassembly including a grid of belts and a plurality of lateral attachment straps extending outward beyond the opposing lateral sides of the flexible fabric panel, each of the lateral attachment straps terminating at a free end in a clip attached to one of the spaced first and second frame members, and stiffeners positioned in the slotted sleeves received through loops of the attachments straps to secure the cargo net subassembly to the diaphragm subassembly.

The inventive aspects disclosed herein are further directed to a seat pan diaphragm assembly including a diaphragm subassembly including a flexible fabric panel having a top, a bottom, a front, a back, and opposing lateral sides, a cargo net subassembly positioned against the bottom of the fabric panel for limiting deflection of the flexible fabric panel under load, the cargo net subassembly including a grid of belts and a plurality of attachment straps having a clip attachable to a seat frame element, and stiffening elements securing the cargo net subassembly to the diaphragm subassembly, the stiffening elements distributing tension across any number of attachment locations.

Embodiments of the inventive concepts may include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTION

Figure 1:
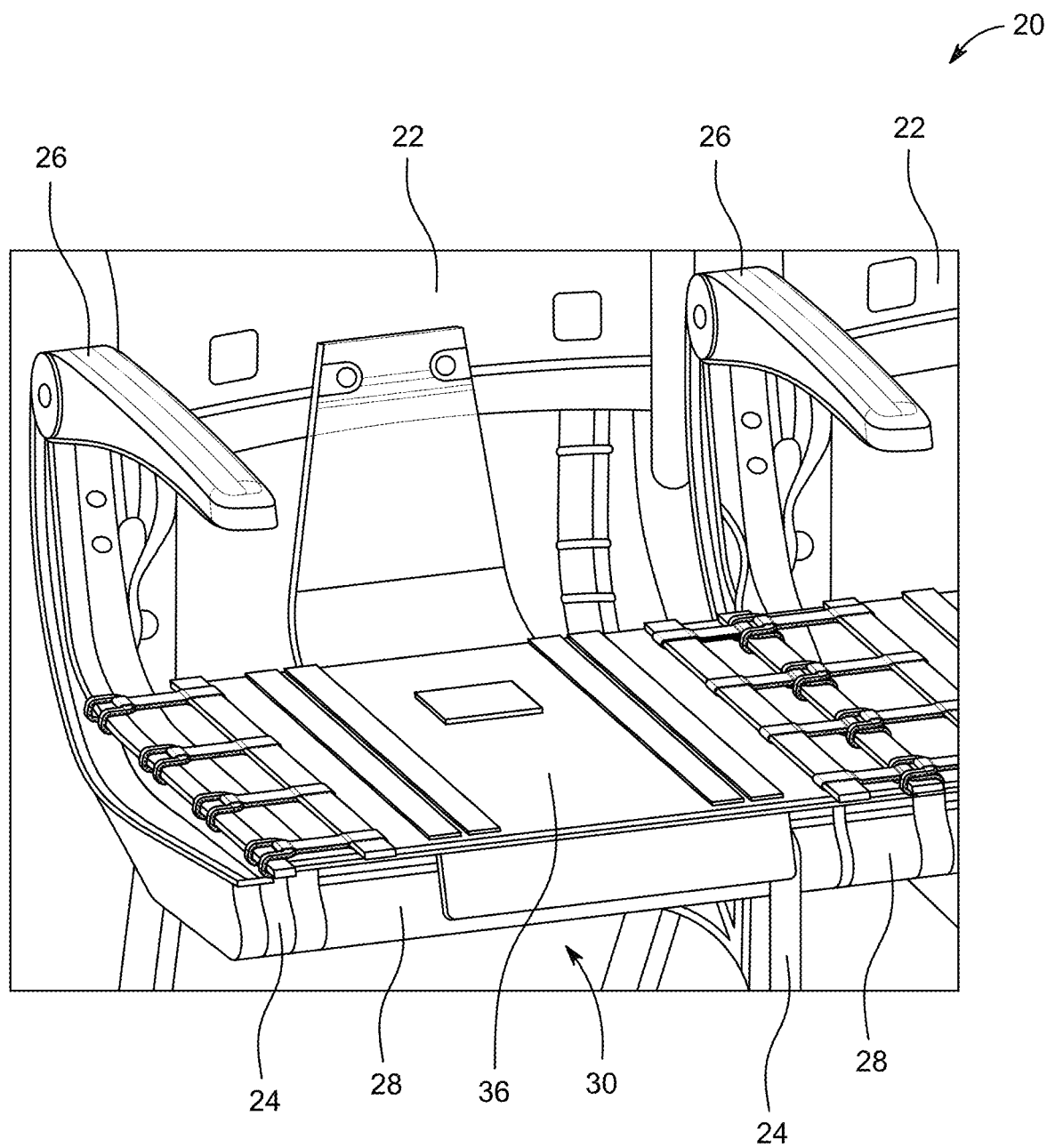
FIG. 1 is a perspective view of a seat pan diaphragm assembly, according to the present disclosure, shown as part of an aircraft passenger seat assembly.
Figure 2:
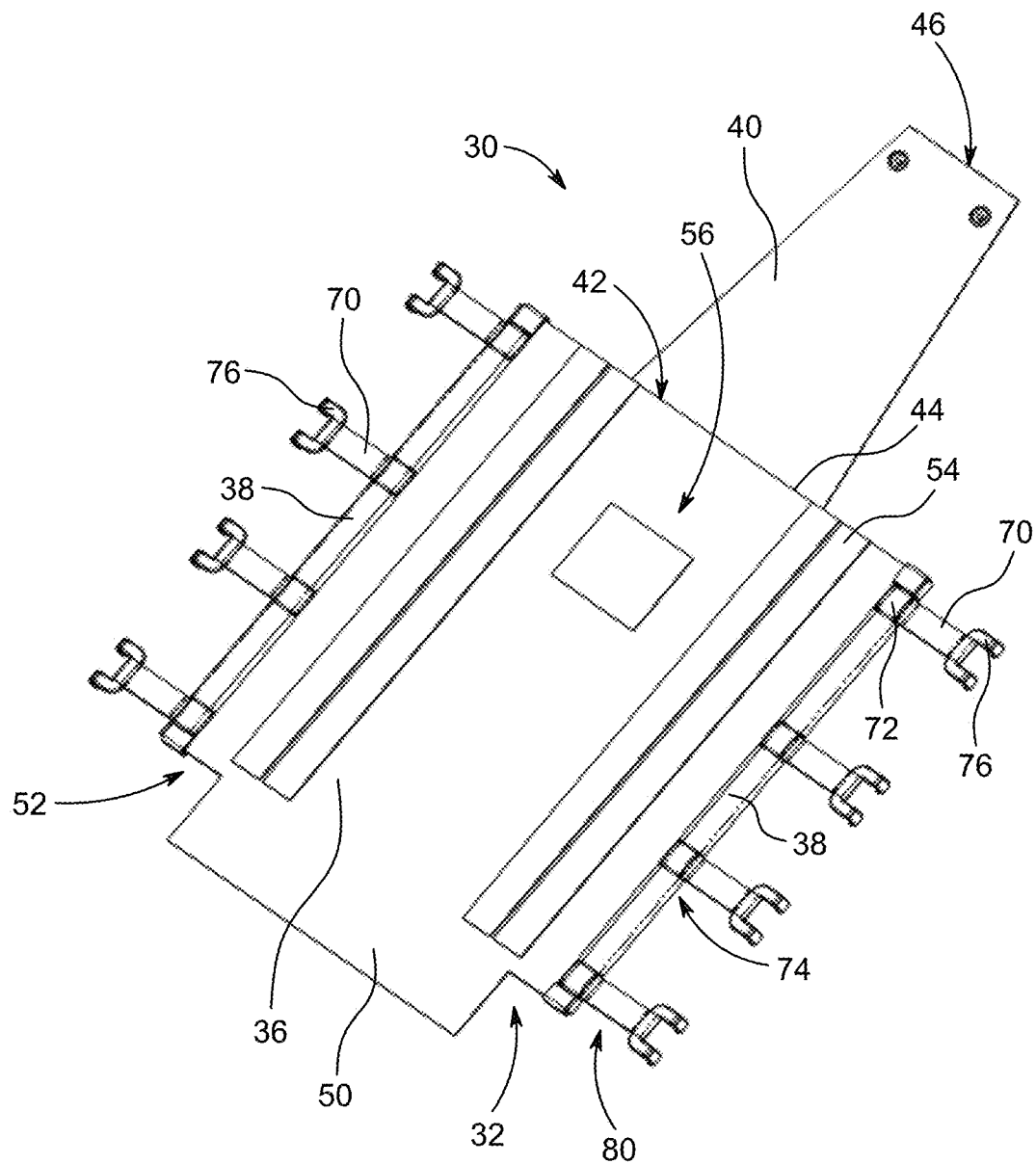
FIG. 2 is a top perspective view of the seat pan diaphragm assembly of FIG. 1.
Figure 3:
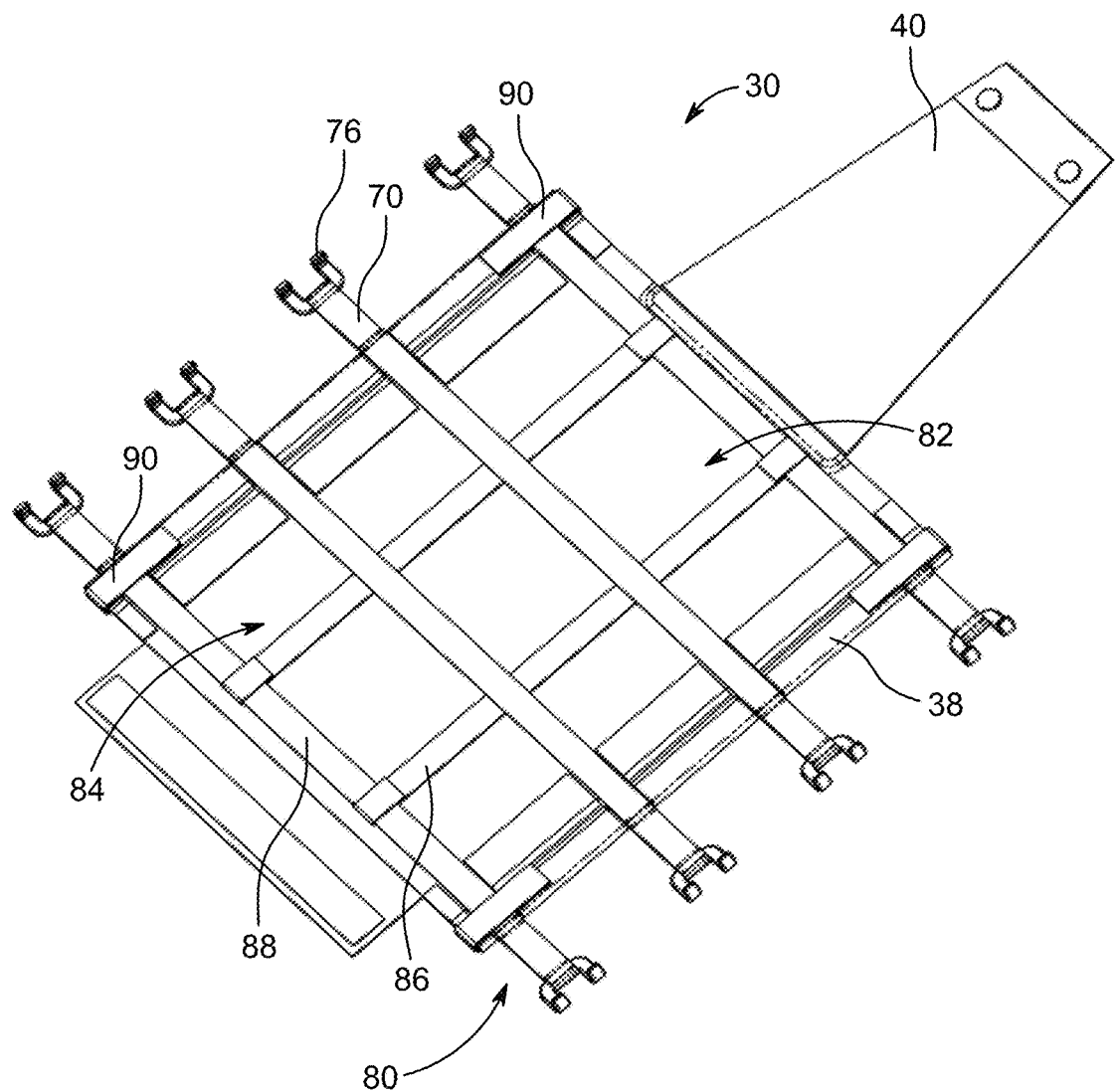
FIG. 3 is a bottom perspective view of the seat pan diaphragm assembly of FIG. 1.
Figure 4:
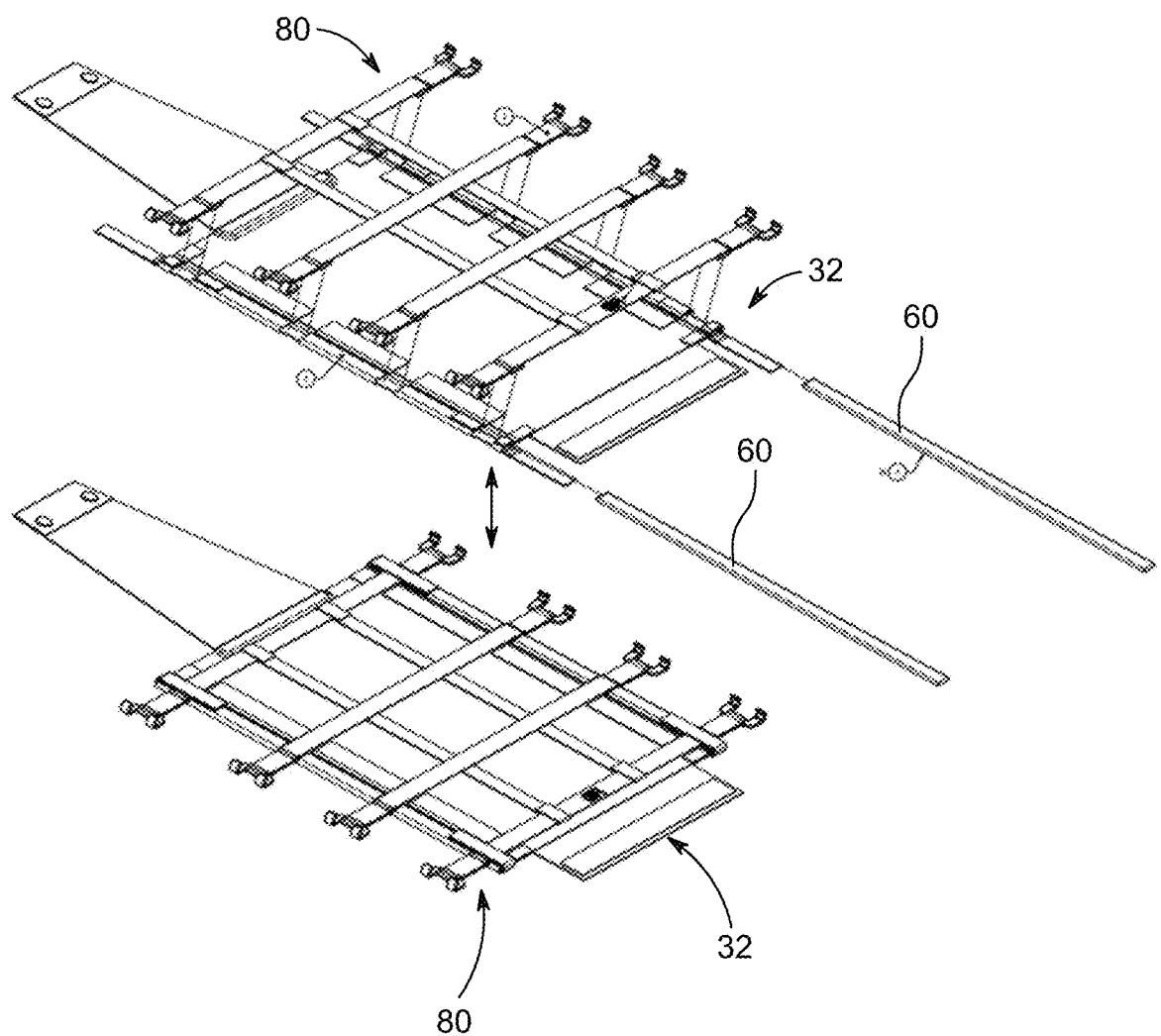
FIG. 4 is an exploded view of the seat pan diaphragm assembly of FIG. 1.
Figure 5:
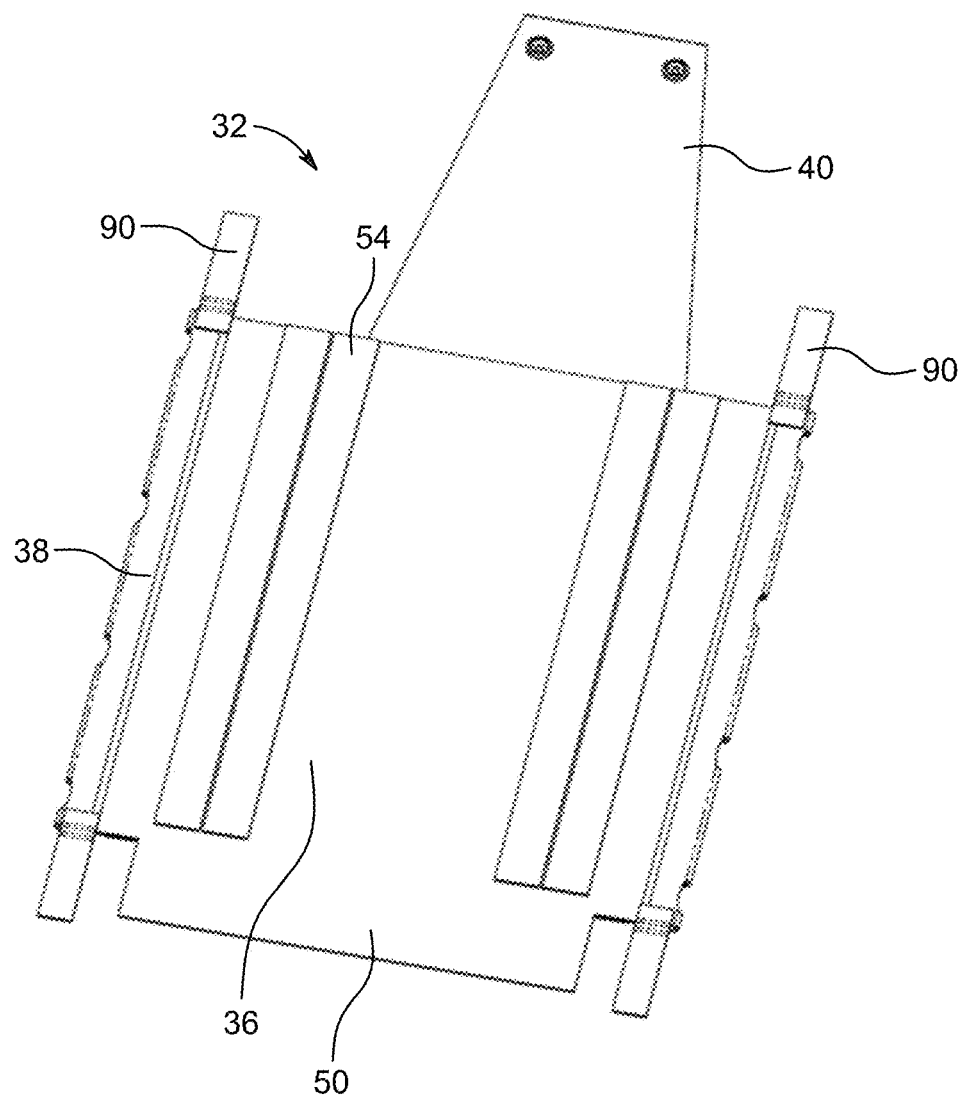
FIG. 5 is a top perspective view of a diaphragm subassembly of the seat pan diaphragm assembly of FIG. 1.
Figure 6:
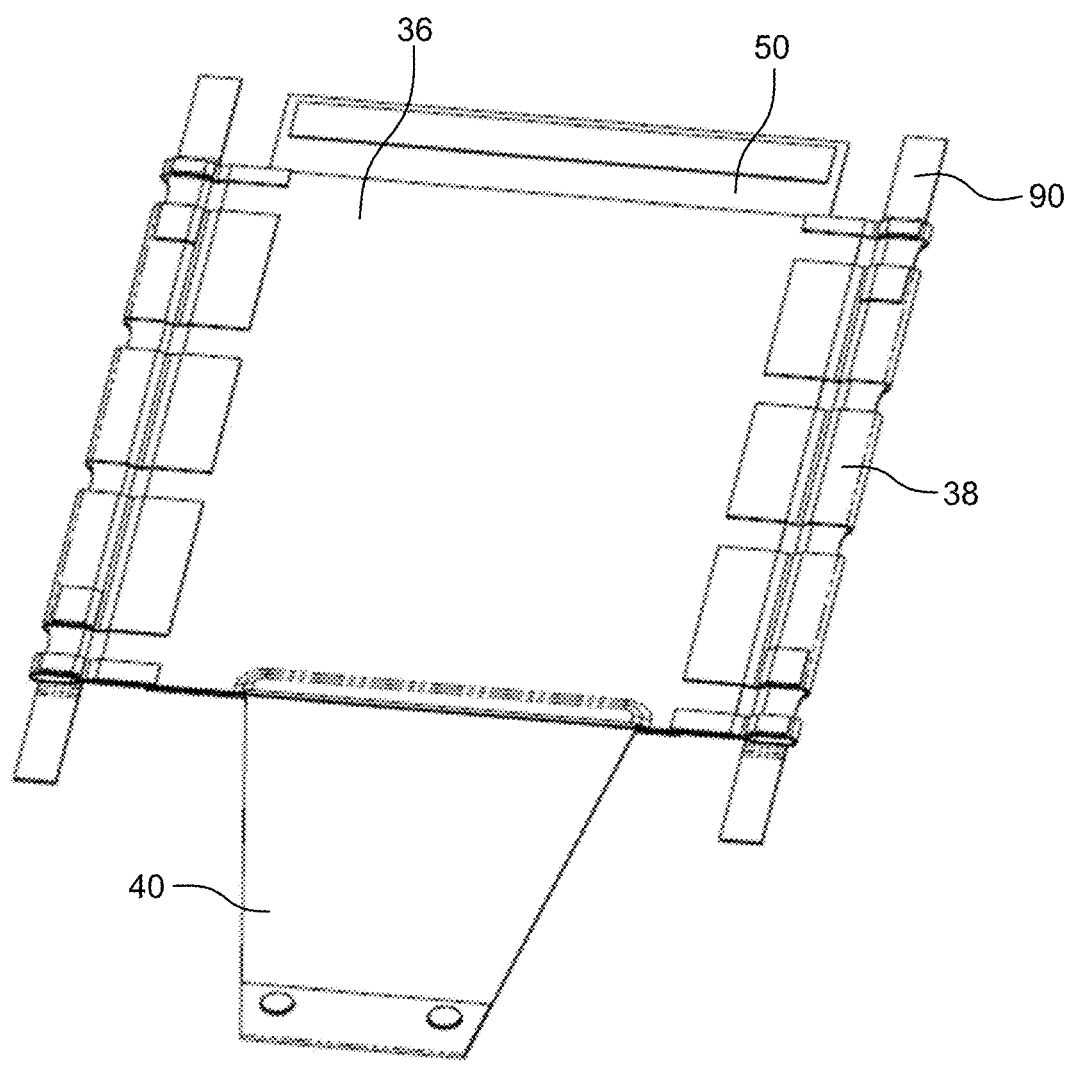
FIG. 6 is a bottom perspective view of the diaphragm subassembly of FIG. 5.
Figure 7:
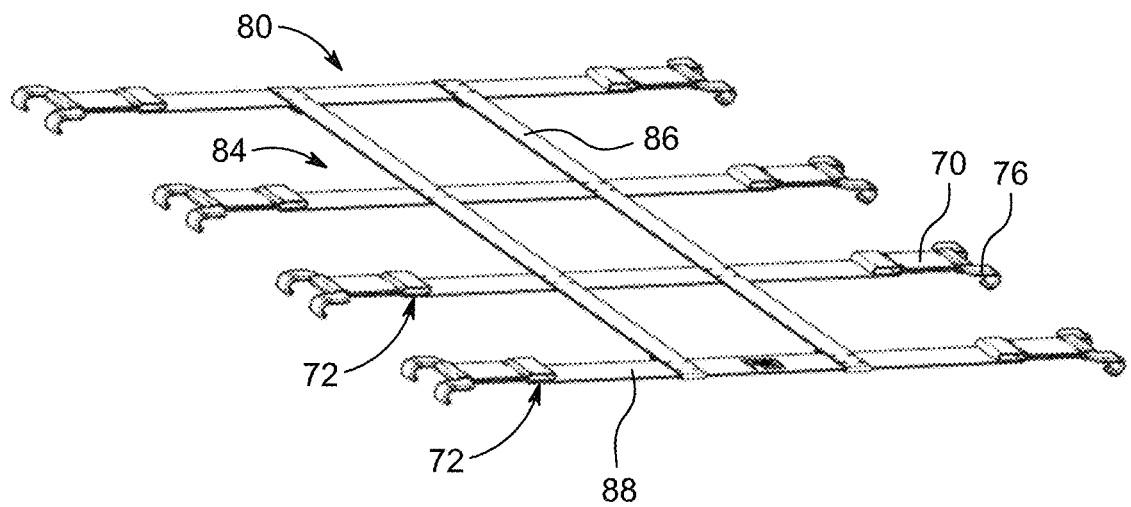
FIG. 7 is a top perspective view of a cargo net subassembly of the seat pan diaphragm assembly of FIG. 1.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

The below-described seat pan diaphragm assembly is attachable between spaced frame elements, such as seat spreaders, to provide a deformable load bearing surface for supporting a seat cushion. The seat pan diaphragm assembly includes a diaphragm subassembly that may be constructed of stretchable suspension fabric that distributes load forces and minimizes pressure points. The seat pan diaphragm assembly further includes a cargo net subassembly having attachment straps with clips attachable to the spreaders or other frame members. In some embodiments, the clips are configured to overlap clips of a separate, laterally-adjacent seat pan diaphragm assembly such that attachment locations can be shared. This allows seat pan diaphragm assemblies to attach and align along a seat unit utilizing shared spreaders to form a row.

The seat pan diaphragm assembly further includes fore-aft extending stiffeners removably received in pockets or sleeves along each lateral side of the flexible fabric panel. Flaps positioned at the corners of the panel, i.e., at the ends of the pockets, close the pockets to retain the stiffeners therein. The stiffeners distribute load forces to the attachment straps and help maintain the shape integrity of the panel and prevent localized high tension zones in the panel.

Fastener elements, such as hook and loop fabric strips and/or panels can be attached to the top of the flexible fabric panel to engage corresponding engagement fabric or fasteners along the bottom of a seat cushion and/or a dress cover to maintain the placement and position of the cushion and dress cover both for passenger comfort and to maintain the condition of the cushion while permitting removal of the cushion when needed.

A tail extends from the back of the flexible fabric panel for attachment to the lower end of a backrest to support loads in the aft portion of the panel under high loads, as well as to further maintain the cushion from sliding rearward in use, for example as a passenger enters the seat and as the backrest is reclined and returned to an upright position.

Along the forward end of the flexible fabric panel, a front flap extends to cover the laterally-extending seat frame member that interconnects the spreaders in a passenger seat assembly. The front flap protects the lower front of a seat cushion from abrasion and pinching due to flexure of the support diaphragm. Also, the front flap may be used to position a life vest container though a hook and loop combination.

The cargo net subassembly includes a net of substantially inextensible belts positioned against the bottom of the flexible fabric panel to support and limit deflection of the panel. The belts may be arranged in a rectangular grid pattern, having fore-aft extending belts and side-to-side or lateral belts. The lateral belts can be attached to or integrally-formed with attachment straps for effective force transfer and to maintain the shape integrity of the panel, which is generally rectangular.

Referring to FIG. 1, a non-limiting example of a passenger seat assembly is shown generally at reference numeral 20. The seat assembly 20 includes frame elements such as a backrest 22 pivotally-mounted between a pair of laterally spaced spreaders 24. A respective armrest 26 extends forward from an upper end of each spreader. The frame elements are shown without the coverings and attachments typically provided for passenger comfort in use. For example, an in-use seat assembly would likely include a backrest cushion and a seat cushion as well as dress covers. These and other components of a passenger seat seating assembly or seating row are not illustrated to permit view of inventive features and benefits.

A seat pan diaphragm assembly 30 according to present disclosure is shown removably attached along opposing first and second sides to respective spaced first and second frame members, for example, left and right spreaders. The seat pan diaphragm assembly 30 generally includes a diaphragm subassembly, a cargo net subassembly, and stiffening elements or "stiffeners" securing the two assemblies together. The diaphragm subassembly generally includes a flexible fabric panel 36 tensioned between the spreaders to support a seat cushion or other seat element upon which a passenger sits in use. In use, the spreaders are ultimately attached to the floor in an aircraft passenger cabin, either directly or indirectly. Frame members 28, such as transverse beams, spanning the lateral spacing between the spreaders further support the rigidity of the seat assembly 20 and bear the tension imparted by the seat pan diaphragm assembly 30 when the seat assembly is occupied and unoccupied by a passenger.

Referring to FIGS. 2-7, the seat pan diaphragm assembly 30 including the diaphragm subassembly 32, cargo net subassembly 80, and stiffeners 60 are shown. A lumbar tail 40 has a lower forward end 42 attached to the back 44 flexible fabric panel 36 and an upper end 46 attached to a lower end of the backrest (see FIG. 1). In use, the lumbar tail 40 supports lumbar loads, prevents a rear portion of a seat cushion (not shown) from slipping rearward, and support loads in the aft portion of the flexible fabric panel 36 under high loads. The lumbar tail 40 is flexible to accommodate flexure of the assembly and pivoting movements of the backrest 22, which is adjustable from an upright position for taxi, take-off, and landing (TTOL), to reclined angles in-flight for passenger comfort. The lumbar tail 40 can be constructed from a flexible sheet material.

A front flap 50 is attached along or integrally-formed with the forward end or front 52 of the flexible fabric panel 36 to cover the laterally-extending seat frame member that interconnects the spreaders below the seat pan diaphragm assembly 30. The front flap 50 extends downward and covers a gap extending laterally between the seat pan diaphragm 30 and frame member. The front flap 50 protects the forward portion of a seat cushion (not shown) from abrasion due to flexure of the support diaphragm 36 relative to the fixed rigid frame member, protects the seat cushion from pinching in the gap covered by the front flap 50, and may assist in positioning a left vert container. The front flap 50, flexible fabric panel 36, and lumbar tail 40 thus provide a flexible support for a seat cushion in use.

The flexible fabric panel 36 is generally rectangular, flexible, and resilient. The flexible fabric panel 36 includes one or more flexible material layers, each generally planar in an unloaded condition. The support diaphragm can utilize suspension fabric, including for example, an open mesh, a tight weave, or non-woven fabric construction. A tri-axial woven fabric may be used. The support diaphragm can be formed from a single piece of fabric or can be assembled from multiple pieces having the same or different material properties. Elastic fabric can be used throughout the support diaphragm or selected portions thereof.

Laterally spaced engagement strips 54 attached to the top 56 of the flexible fabric panel 36 extend rearward to forward to engage to secure in place a seat cushion and/or dress cover (not shown). The engagement strips 54 can be constructed of hook or loop fabric for engaging loop or hook fabrics attached to or a part of seat cushion or dress cover construction. The engagement strips 54 align approximately along leg placement areas to maximally engage the flexible fabric panel 36 and seat cushion when a passenger is seated.

A spaced pair of fore-aft stiffeners 60 (i.e., left and right stiffeners), for example in the form of flat bars, secure the two subassemblies 32, 80 together and facilitate load distribution and durability of the flexible fabric panel 36. A respective fore-aft stiffener 60 extends along each lateral side of the flexible fabric panel 36 within a slotted sleeve 38, for example, defined by a sewn fold or bend in the fabric of the flexible fabric panel. In the assembled seat pan diaphragm assembly 30, each stiffener 60 extends along its respective slotted sleeve 38 and passes through loops formed in the attachments straps to secure the subassemblies together, as discussed in detail below.

In the illustrated embodiments, a laterally inward portion of each attachment strap 70 of the cargo net subassembly 80 defines a loop 72 that positions around a corresponding stiffener 60 received therethrough. The attachment straps 70 extend laterally outward from their engagement with the stiffeners 60 through slots 74 or breaks between spaced portions of the slotted sleeves 38. Each slot 74 opens outward toward an attachment clip end of the attachment straps 70 and extends fore-aft sufficiently to accommodate the width of an attachment strap. The fore-aft stiffeners 60 are at least semirigid to facilitate load distribution as the attachment straps 70 convey forces from the flexible fabric panel 36 to the spreaders. The stiffeners 60 are thus removable from their respective slotted sleeve 38 and when inserted, thread through the alternating sleeve portions and loops to secure the two subassemblies together.

A respective attachment clip 76 is attached to each laterally outward end of each attachment strap 70. In the illustrated embodiments, the laterally outward end of each attachment strap 70 defines a loop around a base member of a respective attachment clip 76. The attachment straps 70 support tension loads and may be constructed of synthetic fabric. The loops at the lateral ends of the attachment straps 70 holding the clips 76 can be formed by sewing or otherwise fixing a fold, bend, or doubling of the strap material. The attachment clips 76 serve to removably attach the seat pan diaphragm assembly 30 to other parts of the passenger seat assembly by hooking around or otherwise engaging the spreaders 24 or like structural frame members.

The cargo net subassembly 80 is positioned against the bottom 82 of the flexible fabric panel 36 and includes a net of substantially inextensible belts 84 to support and limit deflection of the flexible fabric panel 36 under load. In some embodiments, the belts 84 are arranged in a rectangular grid pattern with parallel spaced first belts 86 that extend fore-aft parallel to the opposing lateral sides of the flexible fabric panel. Parallel spaced second belts or lateral belts 88 extend side-to-side, parallel to the front and back of the flexible fabric panel and perpendicular to the first belts 86. The lateral belts 88 are aligned with and attached to or integrally-formed with the attachment straps 70 for effective force transfer to the spreaders 24. The belts 84 may be constructed of substantially inextensible synthetic fibers such as aramid fibers, for example Kevlar® (poly paraphenylene terephthalamide).

Longitudinal flaps 90, one positioned generally at each corner of the flexible fabric panel 36, fold over and secure against the bottom 82 of the flexible fabric panel to close the ends of the slotted sleeves 38 to retain each of the stiffeners 60 in their respective slotted sleeve. To remove a stiffener 60, a flap 90 is detached from the bottom 82 of the flexible fabric panel 36 and moved out of the way to open the entrance to the slotted sleeve 38 to allow the stiffener to be withdrawn from the sleeve.

Figure 8:
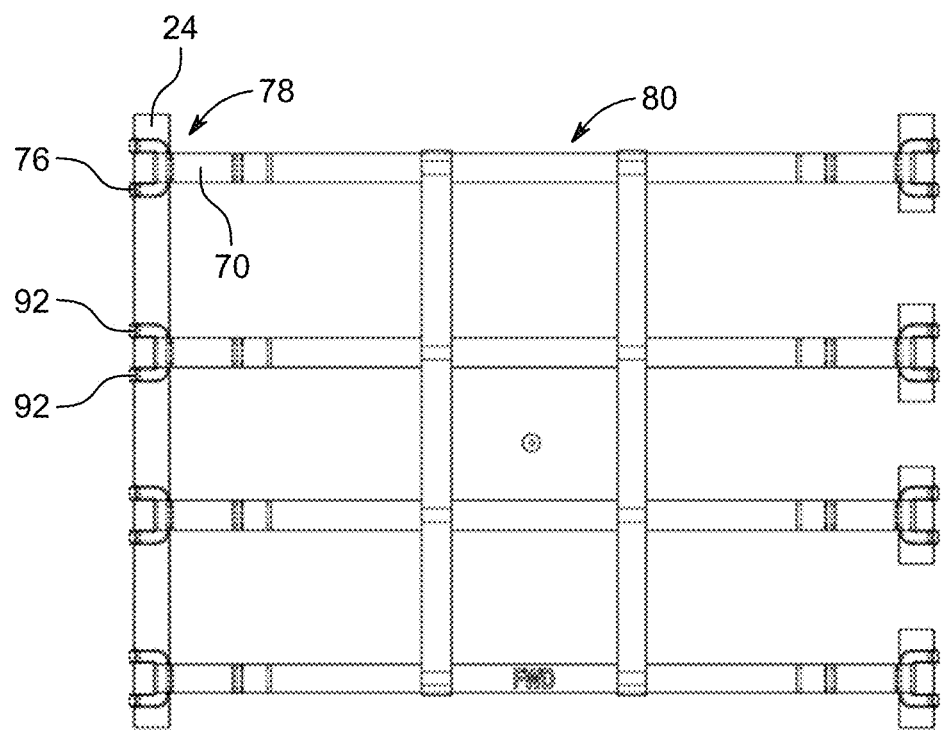
FIG. 8 is a top view of the cargo net subassembly of FIG. 7 shown attached to seat spreaders.
Figure 9:
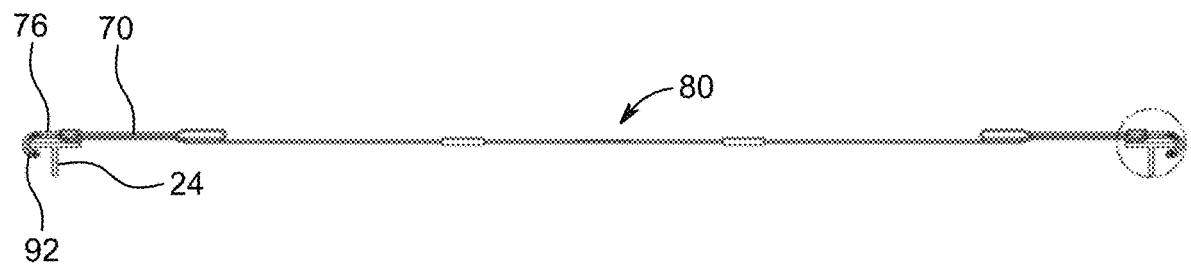
FIG. 9 is an end view of FIG. 8.
Figure 10:
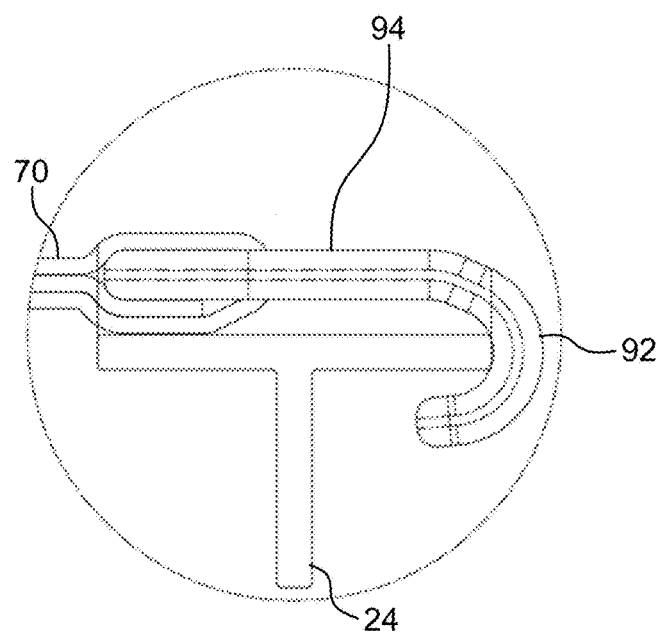
FIG. 10 is a detailed view of one end of FIG. 9.

FIGS. 8-10 show attachment of the cargo net subassembly 80 with spaced frame members such as spreaders. Each attachment clip 76 has a base member extending fore-aft and attached to the laterally outward of free end 78 of the respective attachment strap 70. A pair of spaced hooks 92 each include a first segment extending vertically downward out the common plane of a base member and a second segment extending from the first segment back toward the base member in an offset plane parallel to the common plane. A vertical offset of the second segment relative to the base member and hook arms is defined by the length of the first segment. A receiving space of each hook 92, defined between the second segment and an arm, engages around a top rail of a spreader 24. The length of the hook arms 94 is short such that the arms do not overhang an opposing side of the spreader 24, thereby reducing abrasion/wear of the straps against the spreader.

The flexible fabric panel 36 can be stretched in an unloaded state between spreaders 24, and the attachment clips 76 along each lateral side are engaged with a respective spreader rail. The spreader 24 at each side then supports the seat pan diaphragm 30 as forces are conveyed from the flexible fabric panel 36 to the fore-aft stiffeners 60, from the fore-aft stiffeners to the attachment straps 70, from the attachment straps to the attachment clips 76, and from the attachment clips to the top rails of the spreaders 24.

With the seat pan diaphragm assembly 30 attached along the opposing lateral sides to respective spaced first and second spreaders 24, the elastic fabric of the flexible fabric panel 36 acts with spring-like force to maintain the engagement of the attachment clips 76 with the spreaders 24. The flexible support panel 36 provides a compliant structure that prevents pressure point discomfort. The stiffeners 60 further distribute any focused load forces to the attachment straps 70 and spreaders 24.

Figure 11:
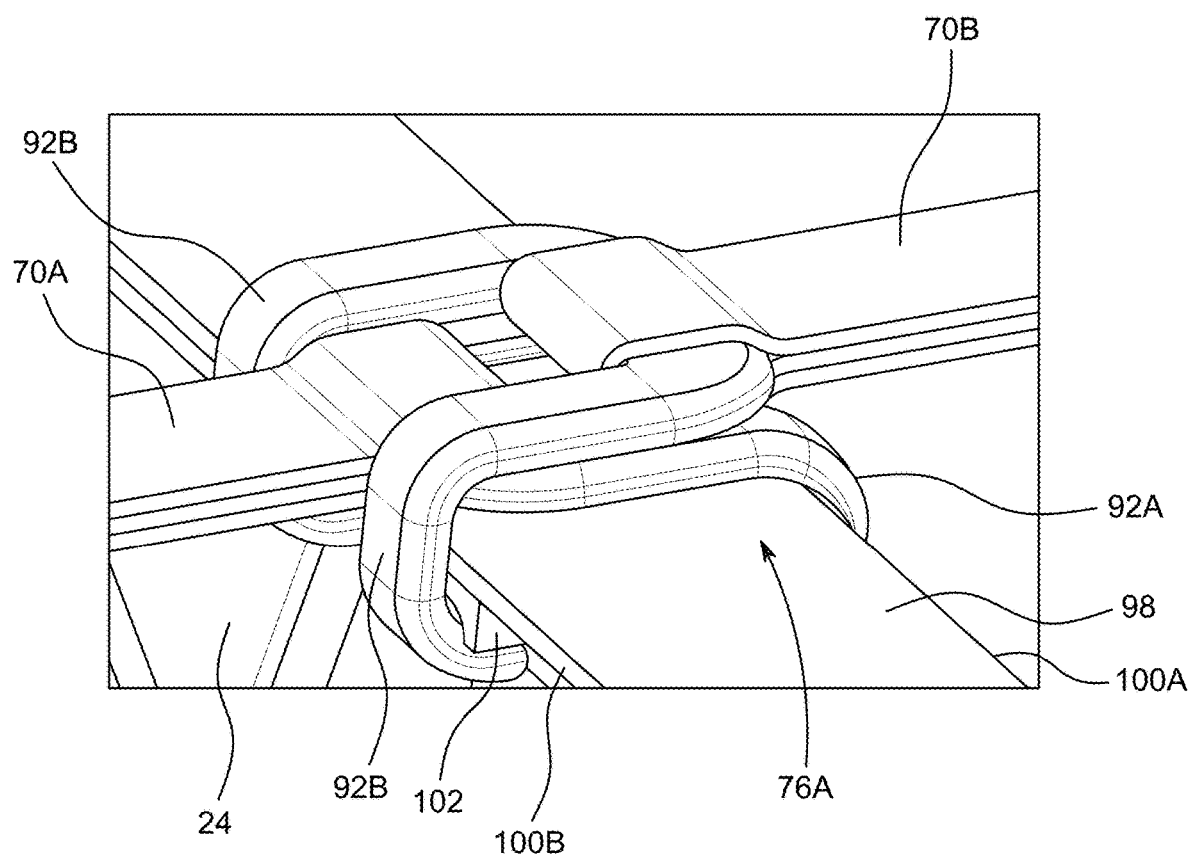
FIG. 11 is an enlarged perspective view of overlapped attachment clips engaging a seat spreader.

As represented in FIG. 1, a spreader 24 may support adjacent sides of adjacent seats in a seating row. The seat pan diaphragm assembly 30 of the present disclosure can be used in adjacent seats by use of attachment clips that overlap as shown in FIG. 11. A portion of a spreader 24 is shown in FIG. 11 as engaged by oppositely directed attachment clips having overlapped arms. A first attachment clip 76A on a first attachment strap 70A has a first base member and first arms placed upon the top surface of the top rail 98 with first hooks 92A engaging a first lateral edge 100A of the top rail 98. A second attachment clip 76B on a second attachment strap 70B is oppositely directed relative to the first attachment clip 76A. The second attachment clip 76B has a second base member that bridges the space between the first arms and over the first lateral edge 100A of the top rail 98. The second arms have second hooks 92B engaging the second lateral edge 100B of the top rail 98 opposite the first lateral edge 100A. The first arms extend in a first lateral direction. The second arms overlap the first arms and extend in a second lateral direction opposite the first lateral direction. This arrangement permits adjacent seat pan diaphragms to be mounted to a shared spreader 24 with their attachment straps aligned without fore-aft offset. Spacers or integral features in the spreaders, shown generally at reference numeral 102, may be used to maintain/locate the hook placement.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A seat pan diaphragm assembly attachable to a seat frame, comprising:
   a diaphragm subassembly including a flexible fabric panel having a top, a bottom, a front, a back, opposing lateral sides, and a slotted sleeve positioned along each of the opposing lateral sides;
   a cargo net subassembly positioned against the bottom of the fabric panel for limiting deflection of the flexible fabric panel under load, the cargo net subassembly including a grid of belts and a plurality of lateral attachment straps extending outward beyond the opposing lateral sides of the flexible fabric panel, each of the lateral attachment straps terminating at a free end in a clip attachable to a seat frame element; and
   stiffeners positioned in the slotted sleeves received through loops of the attachments straps to secure the cargo net subassembly to the diaphragm subassembly.

2. The seat pan diaphragm assembly of claim 1, wherein the slotted sleeves extend from the front to the back of the flexible fabric panel, and wherein each lateral attachment strap is positioned in a slot between spaced portions of the slotted sleeves.

3. The seat pan diaphragm assembly of claim 2, wherein each attachment strap includes a loop positioned inward of the free end in-line with the respective slotted sleeve.

4. The seat pan diaphragm assembly of claim 1, wherein the cargo net subassembly includes first parallel spaced belts extending from front to back of the flexible fabric panel and second parallel spaced belts extending laterally, wherein the lateral attachment straps are secured to ends of the second parallel spaced belts or are integrally-formed with the second parallel spaced belts.

5. The seat pan diaphragm assembly of claim 1, wherein the diaphragm subassembly further comprises a front flap attached to or integrally-formed with the front of the flexible fabric panel that extends forward of the front of the flexible fabric panel.

6. The seat pan diaphragm assembly of claim 1, further comprising a lumbar tail having a forward end attached to or integrally-formed with the back of the flexible fabric panel and an upper end attachable to a lower end of a backrest.

7. The seat pan diaphragm assembly of claim 1, wherein each attachment clip includes a pair of spaced hooks, and wherein at least some of the attachment clips are configured to be overlapped by attachment clips of a laterally-adjacent seat pan diaphragm assembly.

8. The seat pan diaphragm assembly of claim 1, further comprising a longitudinally-extending flap positioned at each corner of the flexible fabric panel in-line with the respective slotted sleeve, each of the longitudinally-extending flaps configured to be folded over and secured to the bottom of the flexible fabric panel to retain the stiffeners in the slotted sleeves.

9. The seat pan diaphragm assembly of claim 1, further comprising at least one fastener element positioned on the top of the flexible fabric panel for securing in place at least one of a seat cushion and a dress cover.

10. An aircraft passenger seat assembly, comprising:
    spaced first and second frame members; and
    a seat pan diaphragm assembly positioned between and removably attached to the spaced first and second frame members, the seat pan diaphragm assembly including:
    i) a diaphragm subassembly including a flexible fabric panel having a top, a bottom, a front, a back, opposing lateral sides, and a slotted sleeve positioned along each of the opposing lateral sides;
    ii) a cargo net subassembly positioned against the bottom of the fabric panel for limiting deflection of the flexible fabric panel under load, the cargo net subassembly including a grid of belts and a plurality of lateral attachment straps extending outward beyond the opposing lateral sides of the flexible fabric panel, each of the lateral attachment straps terminating at a free end in a clip attached to one of the spaced first and second frame members; and
    iii) stiffeners positioned in the slotted sleeves received through loops of the attachments straps to secure the cargo net subassembly to the diaphragm subassembly.

11. The aircraft passenger seat assembly of claim 10, wherein the slotted sleeves are positioned from the front to the back of the flexible fabric panel, and wherein each lateral attachment strap is positioned in a slot between spaced portions of the respective slotted sleeve.

12. The aircraft passenger seat assembly of claim 11, wherein each attachment strap includes a loop positioned inward of the free end in-line with the respective slotted sleeve.

13. The aircraft passenger seat assembly of claim 11, wherein the cargo net subassembly includes first parallel spaced belts extending from front to back of the flexible fabric panel and second parallel spaced belts extending laterally, wherein the lateral attachment straps are secured to ends of the second parallel spaced belts or are integrally-formed with the second parallel spaced belts.

14. The aircraft passenger seat assembly of claim 11, wherein the diaphragm subassembly further comprises a front flap attached to or integrally-formed with the front of the flexible fabric panel that extends forward of the front of the flexible fabric panel.

15. The aircraft passenger seat assembly of claim 11, further comprising a lumbar tail having a forward end attached to or integrally-formed with the back of the flexible fabric panel and an upper end attachable to a lower end of a backrest.

16. The aircraft passenger seat assembly of claim 11, wherein each attachment clip includes a pair of spaced hooks engaging one of the spaced first and second frame members, and wherein at least some of the attachment clips are configured to be overlapped by attachment clips of a laterally-adjacent seat pan diaphragm assembly.

17. The aircraft passenger seat assembly of claim 11, further comprising a longitudinally-extending flap positioned at each corner of the flexible fabric panel in-line with a respective one of the slotted sleeves, each of the longitudinally-extending flaps configured to be folded over and secured to the bottom of the flexible fabric panel to retain the stiffeners in the slotted sleeves.

18. The aircraft passenger seat assembly of claim 11, further comprising at least one fastener element positioned on the top of the flexible fabric panel for securing in place at least one of a seat cushion and a dress cover.

19. The aircraft passenger seat assembly of claim 11, wherein the stiffeners include a right-side stiffener and a left-side stiffener each in the form of a flat bar.

20. A seat pan diaphragm assembly, comprising:
a diaphragm subassembly including a flexible fabric panel having a top, a bottom, a front, a back, and opposing lateral sides;
a cargo net subassembly positioned against the bottom of the fabric panel for limiting deflection of the flexible fabric panel under load, the cargo net subassembly including a grid of belts and a plurality of attachment straps having a clip attachable to a seat frame element; and
stiffening elements secure the cargo net subassembly to the diaphragm subassembly.

* * * * *